United States Patent
Long et al.

(10) Patent No.: US 12,450,578 B2
(45) Date of Patent: Oct. 21, 2025

(54) CRYPTOGRAPHIC TOKEN WITH SEPARATE CIRCULATION GROUPS

(71) Applicant: CUSTODIA BANK, INC., Cheyenne, WY (US)

(72) Inventors: Caitlin Frances Long, Cheyenne, WY (US); Bryan Allen Bishop, Austin, TX (US); Zev Naftali Shimko, San Francisco, CA (US); Britney Dawn Reddy, Cheyenne, WY (US); Charles Daniel Thompson, New York, NY (US)

(73) Assignee: CUSTODIA BANK, INC., Cheyenne, WY (US)

( * ) Notice: Subject to any disclaimer, the term of this patent is extended or adjusted under 35 U.S.C. 154(b) by 0 days.

(21) Appl. No.: 18/335,442

(22) Filed: Jun. 15, 2023

(65) Prior Publication Data
US 2023/0325793 A1    Oct. 12, 2023

Related U.S. Application Data

(63) Continuation of application No. 17/339,790, filed on Jun. 4, 2021, now abandoned.

(60) Provisional application No. 63/057,057, filed on Jul. 27, 2020.

(51) Int. Cl.
G06Q 20/06 (2012.01)
G06Q 20/36 (2012.01)
G06Q 20/38 (2012.01)

(52) U.S. Cl.
CPC ..... *G06Q 20/0658* (2013.01); *G06Q 20/3678* (2013.01); *G06Q 20/389* (2013.01)

(58) Field of Classification Search
CPC ............... G06Q 20/00–425; H04L 9/00–50
See application file for complete search history.

(56) References Cited

U.S. PATENT DOCUMENTS

| | | | |
|---|---|---|---|
| 7,035,854 B2 | 4/2006 | Hsiao et al. | |
| 11,200,569 B1 | 12/2021 | James et al. | |
| 2003/0200202 A1 | 10/2003 | Hsiao et al. | |
| 2018/0268382 A1* | 9/2018 | Wasserman | H04L 9/3247 |

(Continued)

FOREIGN PATENT DOCUMENTS

| | | |
|---|---|---|
| CA | 3038682 A1 | 10/2019 |
| GB | 2570469 A | 7/2019 |

OTHER PUBLICATIONS

Applied Blockchain, "KO: An investigation into using private tokens on smart contract platforms," Version 0.1, Jul. 4, 2019, retrieved at https://appliedblockchain.com/k0.pdf on Jan. 20, 2022.

(Continued)

*Primary Examiner* — Ari Shahabi
(74) *Attorney, Agent, or Firm* — Perkins Coie LLP; Colin Fowler

(57) ABSTRACT

A custom cryptographic token and smart contract that is configured to exist in one of two groups and is issued by the same bank or depository institution that also collects corresponding fiat currency deposits. The two groups are a circulation group and a non-circulation group. The non-circulation group is not associated with any given user, but rather an issuing entity. Custom cryptographic tokens residing in the circulation group are associated with a user and are traded according to smart contract protocol.

21 Claims, 6 Drawing Sheets

(56) References Cited

U.S. PATENT DOCUMENTS

| | | | |
|---|---|---|---|
| 2019/0081789 A1* | 3/2019 | Madisetti | H04L 9/0637 |
| 2019/0197518 A1* | 6/2019 | Puehse | G06Q 20/3278 |
| 2019/0220852 A1* | 7/2019 | Black | G06Q 20/401 |
| 2019/0333054 A1* | 10/2019 | Cona | H04L 9/3297 |
| 2020/0021598 A1 | 1/2020 | Lee et al. | |
| 2020/0167769 A1 | 5/2020 | Green | |
| 2020/0186338 A1 | 6/2020 | Andon et al. | |
| 2020/0302433 A1 | 9/2020 | Green | |
| 2020/0311721 A1 | 10/2020 | Ow et al. | |
| 2020/0351093 A1 | 11/2020 | Madhuram et al. | |
| 2021/0012332 A1 | 1/2021 | Ow et al. | |
| 2021/0036855 A1 | 2/2021 | Kleniewski et al. | |
| 2022/0027867 A1 | 1/2022 | Long et al. | |
| 2022/0076334 A1 | 3/2022 | Filter et al. | |
| 2022/0092562 A1 | 3/2022 | Long et al. | |

OTHER PUBLICATIONS

International Search Report and Written Opinion mailed Oct. 21, 2021 in PCT International Patent Application No. PCT/US2021/043159, 33 pages.

Tianqi et al., "Analysis of Blockchain System with Token-Based Bookkeeping Method" (Year: 2019).

Extended European Search Report dated Jan. 4, 2024, for European Patent Application No. 21850423.1, 10 pages.

\* cited by examiner

CRYPTOGRAPHIC TOKEN WITH SEPARATE CIRCULATION GROUPS

CROSS-REFERENCE TO RELATED APPLICATIONS

This application is a continuation of U.S. patent application Ser. No. 17/339,790, entitled "CRYPTOGRAPHIC TOKEN WITH SEPARATE CIRCULATION GROUPS," filed Jun. 4, 2021, which claims priority to U.S. Provisional Patent Application No. 63/057,057, entitled "AVIT: A BANK-ISSUED ELECTRONIC NEGOTIABLE INSTRUMENT," filed Jul. 27, 2020, the disclosures of which are incorporated herein by reference in their entirety and made part of the present disclosure.

TECHNICAL FIELD

The disclosure relates to generation and management of custom cryptographic tokens and more specifically smart contracts that dictate rules for cryptographic tokens.

BACKGROUND

Cryptocurrencies such as Bitcoin and Ethereum circulate on distributed consensus networks and are recorded by blockchain data structures. A blockchain is an immutable, append-only public ledger. A benefit of such a data structure is that it is reliable, secure, and open. Some cryptocurrencies, such as Bitcoin and Ethereum, can be further configured to execute smart contracts via virtual machines.

Cryptographic tokens are cryptographic elements that are generated on a blockchain data structure and are generally linked to a cryptocurrency via connection to that blockchain. Examples include the ERC-20 and ERC-721 specifications on the Ethereum blockchain.

DETAILED DESCRIPTION

Figure 1:
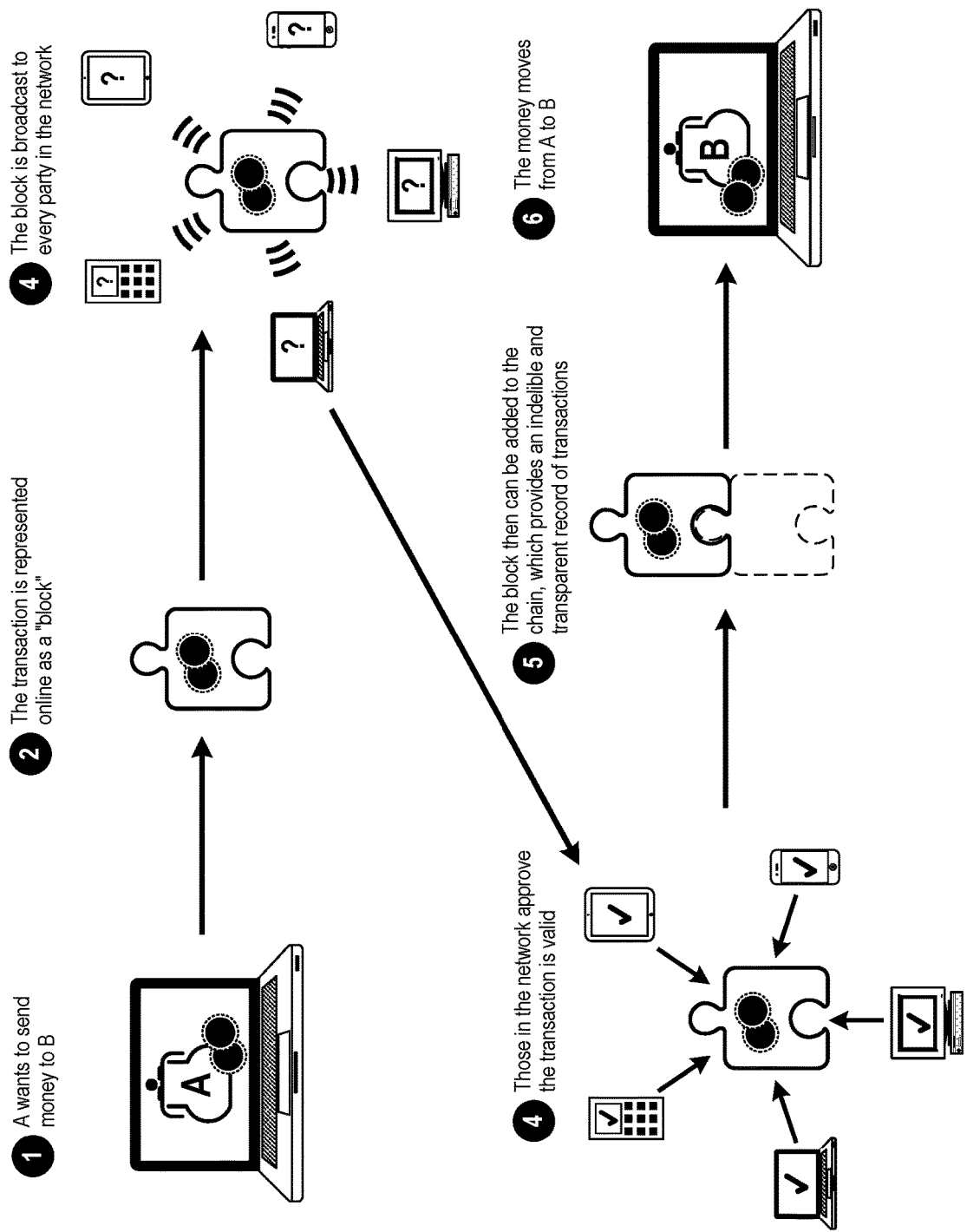
FIG. 1 is a block diagram of a blockchain data structure according to the prior art.

The emergence of cryptocurrency has posed problems for regulatory bodies such as the United States Government. In some circumstances, it behooves users to cooperate with regulatory bodies by seeking permission to operate within existing regulatory frameworks instead of asking for forgiveness after the fact for innovations that do not fit neatly into them. In those circumstances, the distributed nature of the cryptographic coins impedes the ability to comply. Thus, there is a need to implement a cryptographic coin that retains many of the benefits of the distributed system but includes data structures that enable compliance with laws, rules and regulations.

This section discusses a new product, a bank-issued electronic negotiable instrument called "Avit." An Avit is a cryptographic token implemented via a smart contract (e.g., such as an ERC-20 token on the Ethereum platform) and representative of an electronic negotiable instrument—a bank obligation issued as the electronic equivalent of a promissory note, which can be endorsed to a new payee and can be redeemed by the most recent payee. It is akin to a cashier's check but is legally and structurally distinct. Avit has no direct analogue to an existing payment product. Avits are not legal tender, securities, or commodities. Avits are electronic negotiable instruments that provide a private sector solution to the problems of inefficiency and counterparty risk in traditional payment systems. While the Avit relies primarily on the uniform electronic transmissions act (UETA) and similar e-sign laws in states that have not enacted UETA, Avit also maps onto existing uniform commercial code (UCC) law.

To illustrate a problem solved by Avit, an example company previously ran an experiment regarding cash trapped in the company's 700+ bank accounts globally. The company's commercial banks required it to hold extra cash—which the company's treasurer nicknamed "comfort deposits"—to fund latency in settling payments. These "comfort deposits" were required by its banks in order to ensure that this company, which had a high cost of capital, would never overdraw its bank accounts due to timing mismatches in settling its payments. The experiment showed that if same-day payment settlement were possible, approximately $200 million of the company's trapped (and expensive) capital could be unlocked and put to more efficient use.

An additional motivation for the disclosure herein was recognition of a major problem with mismatches with timing of securities and payment settlement that affect pension funds. A pension fund's brokerage statement displayed an accurate list of all of the securities (legally, "security entitlements") held in its custodial account, but the custody bank did not in fact have several of those securities in its custody and was unable to deliver them per the instructions of the pension fund. This problem was able to occur because the custodian lent the securities from its omnibus account without flagging in its ledger systems that a quantity of the omnibus account securities should not have been available for lending. Due to the inherent mismatches in the ledger systems, this problem could not have been discovered by the pension fund in advance. These and other similar experiences led the inventors to look for technology solutions to improve financial sector operations that were inefficient and slow due to high levels of friction, caused inaccurate accounting and were harming consumers.

A fundamental problem was that traditional ledger systems were built to solve for technology constraints that no longer exist. And those same outdated ledger systems remain ubiquitous. The systems dictate that multiple layers of intermediaries be involved, and each intermediary settles in sequence instead of all settling simultaneously. Accordingly, the intermediaries duplicate and reconcile information. The sequential settling among multiple intermediaries causes friction and is why transaction settlement is slow and expensive. It also ties up capital in unsettled transactions. Because of the inherent inability to simultaneously settle both sides of a trade, these ledger systems also introduce counterparty credit risk where it would not otherwise exist. These traditional ledger systems also inhibit transparency and make regulatory oversight more difficult.

Wire Transfers and ACH Cause Problems for Digital Asset Investors:

ACH transfers pose serious structural problems for digital asset investors. The most guaranteed form of money transfer is wire transfers, which are processed slower than digital asset transactions (sometimes taking multiple days while digital asset transactions are nearly instantaneous). Transferring funds via ACH has additional downfalls for use in digital asset transactions as there are chargebacks, adjustments, and errors that can be reversed via this type of electronic payment, which is a risk management problem since most digital asset transactions are irreversible. Regulation E, which applies to banks and certain other financial intermediaries, requires that a consumer be permitted to dispute an electronic transfer up to the date that is 60 days following the statement cycle (meaning as long as 90 days). This means value, in the form of goods and services, is often provided long before the provider thereof is guaranteed final receipt of funds. As a consequence, many digital asset traders, fintech companies, and even more traditional merchants are moving towards other forms of payment, such as stablecoins, that provide faster settlement finality and certainty of payment. The use by these merchants of traditional ACH payments necessitates that they manage cumbersome ACH backstop facilities to account for inevitable disputes and clawbacks. Further, ACH fraud is becoming more prevalent as it becomes easier to access or compromise the private information that is used to conduct fund transfers via ACH. All these factors are driving businesses to seek alternatives to the traditional banking payment methods.

Avit provides a regulated alternative to stablecoins that solves these structural and fraud problems. It is important to add, though, that there are also legitimate reasons why stablecoins are popular—because they solve the delay, chargeback, dispute, adjustment, and error problems that pose particularly high risks to the seller of a digital asset when the buyer pays with ACH or wire transfer. Moreover, stablecoins are "programmable" with software in a way that neither bank deposits nor central bank money is currently, as we will explain in more detail below. Stablecoins settle faster, offer better settlement finality, provide more functionality, and are often cheaper to use than traditional payment systems. For these reasons, legitimate businesses are beginning to use stablecoins in lieu of traditional US dollar payment services.

FIG. 1 is a block diagram of a blockchain data structure according to the prior art. Cryptocurrency networks operate on a distributed network architecture. Key to understanding cryptocurrency is the data structure upon which the network operates. For example, the Bitcoin and Ethereum networks use a data structure referred to as a blockchain.

The blockchain includes a history of all transactions that have ever occurred on the network. Each full node in the distributed network holds a full copy of the blockchain. To participate in the network at all, the blockchain history must be consistent with the history achieved by at least a majority of consensus. This consistency rule has an important effect of causing the blockchain to be immutable. In order to effectively attack a blockchain, one must control 51%+ of the processing power of the entire network. Where the network is comprised of thousands or hundreds of thousands of nodes, assembling the requisite 51% of processing power is exceedingly difficult. While it is true that many nodes often group together in pools that work together to solve for nonces to propagate the Bitcoin blockchain, for example, the grouped nodes of the pool do not necessarily share common control. While they have agreed to pay any mined coins to a central pot that is shared amongst the pool, this does not mean they are able to collude to make changes to the blockchain.

When a given node intends to generate a transaction, the transaction is propagated throughout the nodes until it reaches a node or group of nodes that can assemble into a block that transaction and other transactions generated during a contemporaneous period of time. Until a transaction appears in a block it is not published or public. Often a transaction isn't considered confirmed in the Bitcoin blockchain, for example, until 5 additional blocks have been added for a total of 6 confirmations.

At the time of this filing, Bitcoin blocks are limited to a static size and are generated approximately every 8 to 15 minutes. This illustrates an important limitation of the Bitcoin network: it only processes approximately 7 transactions per second. Conversely, Ethereum limits block size based on the amount of processing the contracts in the given block call for and are appended every 5 to 15 seconds. While cryptocurrency networks technically begin processing transactions in real-time, and the existence of a block including a given transaction verifies that transaction's authenticity, until that block is published to the blockchain, the transaction is not considered verified.

Gaps in verification time introduces the issue within the Bitcoin network at a given moment of "who has the money." During the 10-15 minute span between block generation, transactions that have been submitted may not actually process. This would occur when a user spends money they didn't have, or "double spends." This is not to say the network has no verification mechanism between blocks. For example, when a given user attempts to pay another user, the system may easily query older blocks to inspect the given user's balance as of at least the most recently published block. If the given user has sufficient funds, it is moderately safe to trust the transaction prior to its inclusion in a block published to the blockchain.

However, if the given user is attempting to double spend all their money, only one of those transactions will publish in the next block. The other will be rejected (which one is rejected, and which one processes is the subject of a so-called race condition and not necessarily dependent on time of generation).

Thus far, Bitcoin has been discussed as a network for trading Bitcoins. However, Bitcoin transactions have additional utility in that they can embed additional data. As contemplated above, Bitcoin can be used to purchase and record the existence of data at a given point in time. Recording data is performed by including hashed data within an output field of a given transaction. In this manner, the proof of existence for any document or recorded data may be embedded into the immutable history of the blockchain.

Systems that utilize the Bitcoin blockchain to transfer the ownership of non-coin assets require software that is separate from and merely relies upon the immutability of the blockchain. The separate software is not necessarily secure or immutable itself. Ethereum takes the ability to buy and sell non-coin assets a step further.

Smart contracts are in effect software that runs on the blockchain, which could be Bitcoin, Ethereum or other similar smart contract system. Smart contract software is often open source and subject to inputs that are related to the blockchain itself.

Figure 2:
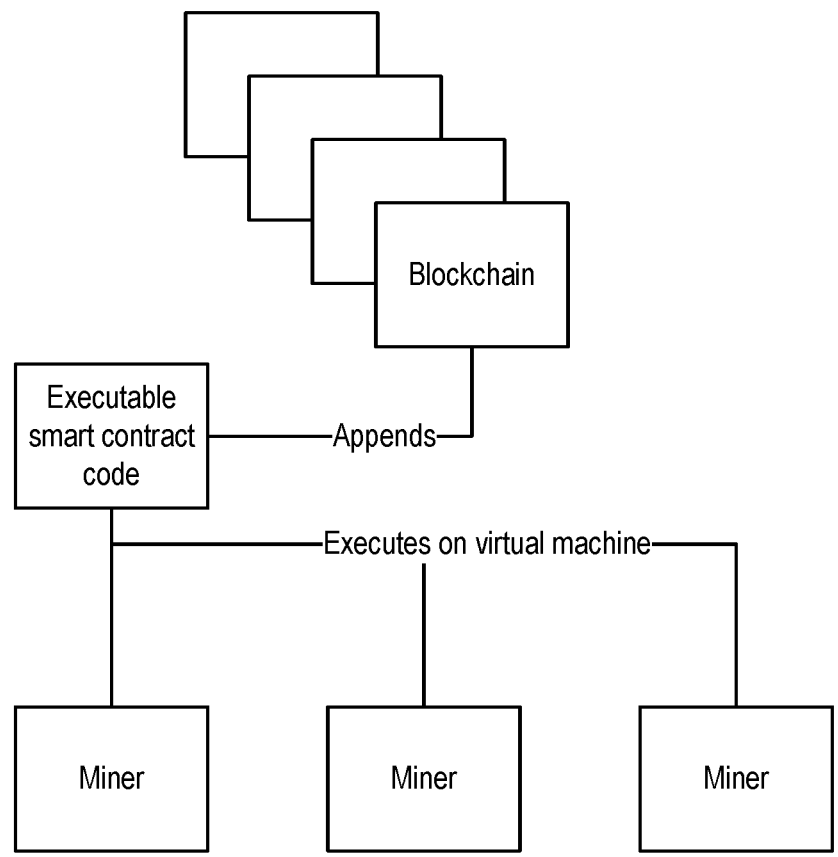
FIG. 2 is a block diagram illustrating a data structure of a smart contract according to the prior art.

FIG. 2 is a block diagram illustrating a data structure of a smart contract on the Ethereum blockchain. Smart contracts and dApps (distributed applications) execute on an Ethereum virtual machine ("EVM"). The EVM is instantiated on available network nodes. Smart contracts and dApps are applications that execute; thus, the processing power to do so must come from hardware somewhere. Nodes must volunteer their processors to execute these operations based on the premise of being paid for the work in Ethereum coins, referred to as Ether, measured in "gas." Gas is the name for a unit of work in the EVM. The price of gas can vary, often because the price of Ether varies, and is specified within the smart contract/dApp.

Every operation that can be performed by a transaction or contract on the Ethereum platform costs a certain number of gas, with operations that require more computational resources costing more gas than operations that require few computational resources. For example, a multiplication instruction may require 5 gas, whereas an addition instruction may require 3 gas. Conversely, more complex instructions, such as a Keccak256 cryptographic hash may require 30 initial gas and 6 additional gas for every 256 bits of data hashed.

The purpose of gas is to pay for the processing power of the network on execution of smart contracts at a reasonably steady rate. That there is a cost at all ensures that the work/processing being performed is useful and valuable to someone. Thus, transaction fees in the Ethereum network represent processing power. This differs from transaction fees in the Bitcoin network, which are based on the size in kilobytes of a transaction. Because Ethereum's gas costs are rooted in computations, even a short segment of code can result in a significant amount of processing performed. The use of gas further incentivizes coders to generate efficient smart contracts/algorithms to minimize the cost of execution. Unrestricted, an exponential function may bankrupt a given user.

While operations in the EVM have a gas cost, gas has a "gas price" measured in ether. Transactions specify a given gas price in ether for each unit of gas. The fixing of price by transaction enables the market to decide the relationship between the price of ether and the cost of computing operations (as measured in gas). The total fee paid by a transaction is the gas used multiplied by gas price.

If a given transaction offers very little in terms of a gas price, that transaction will have low priority on the network. In some cases, the network miners may place a threshold on the gas price each is willing to execute/process for. If a given transaction is below that threshold for all miners, the process will never execute. Where a transaction does not include enough ether attached (e.g., because the transaction results in so much computational work that the gas costs exceed the attached ether) the used gas is still provided to the miners. When the gas runs out, the miner will stop processing the transaction, revert changes made, and append to the blockchain with a "failed transaction." Failed transactions may occur because the miners do not directly evaluate smart contracts for efficiency. Miners will merely execute code with an appropriate gas price attached. Whether the code executes to completion or stalls out due to excessive computational complexity is of no consequence to the miner.

Where a high gas price is attached to a transaction, the transaction will be given priority. Miners will process transactions in order of economic value. Priority on the Ethereum blockchain works similarly as that of the Bitcoin blockchain. Where a user attaches more ether to a given transaction than necessary, the excess amount is refunded back to that user after the transaction is executed/processed. Miners only charge for the work that is performed. A useful analogy regarding gas costs and price is that the gas price is similar to an hourly wage for the miner, whereas the gas cost is like a timesheet of work performed.

A type of smart contract that exists on the Ethereum blockchain are ERC-20 tokens (Ethereum Request for Comment-20). ERC-20 is a technical specification for fungible tokens. ERC-20 defines a common list of rules for Ethereum tokens to follow within the larger Ethereum ecosystem, allowing developers to accurately predict interaction between tokens. These rules include how the tokens are transferred between addresses and how data within each token is accessed. ERC-20 provides a framework for a means to build a token on top of a base cryptocurrency. In some embodiments herein, enhancements are built on top of the ERC-20 framework, though use of the ERC-20 technical specification is not inherently necessary and is applicable to circumstances where Ethereum is used as the base cryptocurrency.

Thus far discussion has been focused around Bitcoin and Ethereum. As applicable in this disclosure, these are base cryptocurrencies. Other base cryptocurrencies exist and more will likely be introduced in the future. This disclosure is not limited to application on specifically the Bitcoin or Ethereum blockchains.

A custom cryptographic token as described in this disclosure (hereafter, "custom token") described herein shares many of the characteristics of both fungible (ERC-20) and non-fungible tokens (ERC-721). An Avit may be represented by either of these Ethereum specifications, or other token specifications on other blockchain and cryptographic finance data structures. Custom tokens may be designed to represent complete or fractional ownership interests in assets and/or entities. While tokens have no limitations on who can send or receive the token, custom tokens are subject to many restrictions based on identity, jurisdiction and asset category.

The concept of tokens is understood in the blockchain space today. Tokens represent access to a network, and a given token purchase represents the ability to buy goods or services from that network—for example, an arcade token allows users to play an arcade game machine. Tokens give users that same type of access to a product or service. On the other hand, custom tokens represent complete or fractional ownership in an asset (such as shares in a company, a real-estate asset, artwork, etc.). Owning a stake in a company, real estate, or intellectual property can all be represented by custom tokens. Custom tokens offer the benefit of bringing significant transparency over traditional paper shares through the use of the blockchain and its associated public ledger. Custom token structure, distribution, or changes that could affect investors are now accessible to all via the blockchain.

Figure 3:
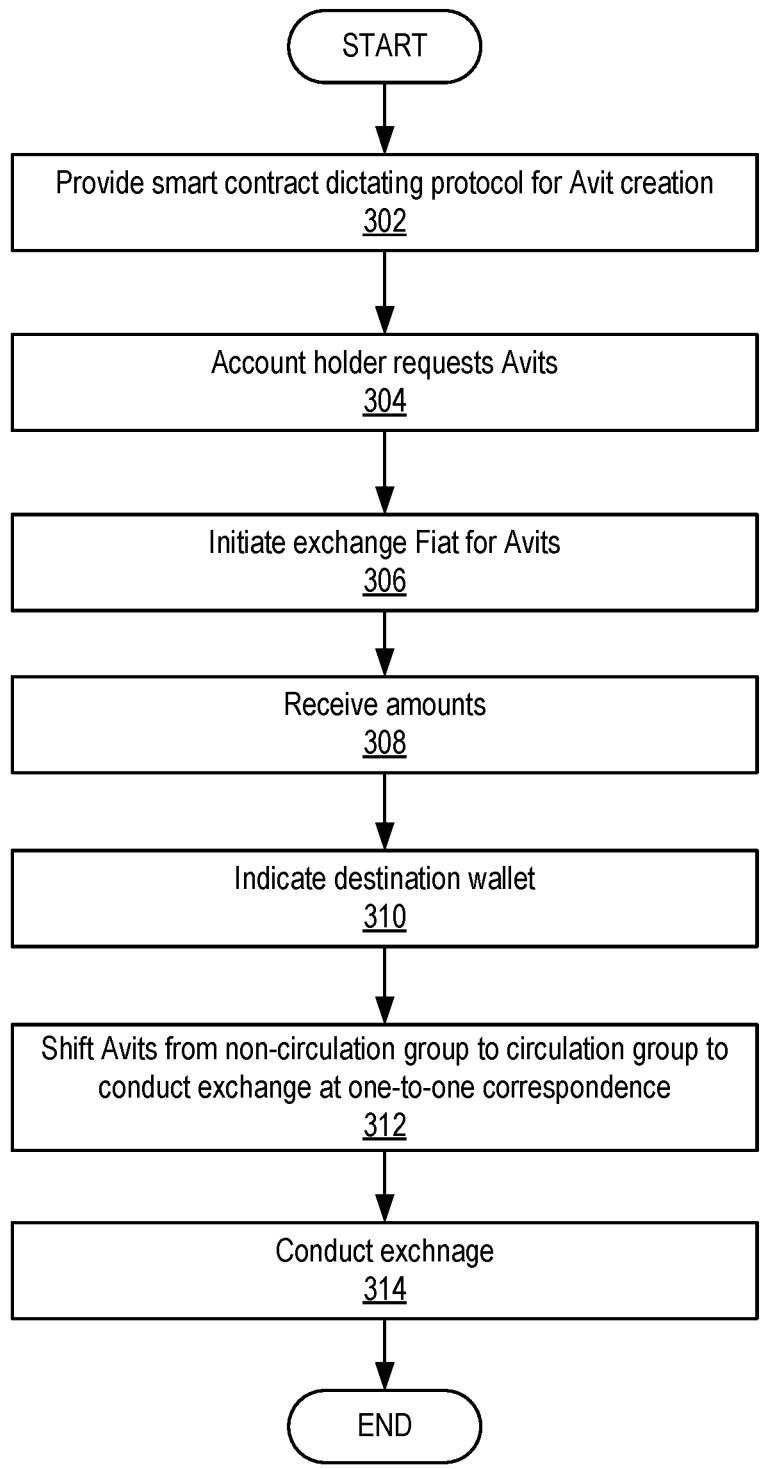
FIG. 3 illustrates a process to obtain Avits.

FIG. 3 illustrates a process to obtain Avits. In step 302, an administrator provides a smart contract that dictates the protocol for creation and management of Avits. Avits are custom cryptographic tokens that are issued via smart contracts on one or more blockchain platforms. Operation of the smart contract on Ethereum, for example, is performed via processing that is "paid for" using gas prices of the executed commands in the contract. Gas is paid for via use of an underlying cryptocurrency, such as ether. A distinction is drawn between a cryptographic token and a cryptocurrency in that one (the token) is a cryptographic object that is created and belongs to a smart contract, whereas the other (the currency) is a cryptographic object that is generated through appending blocks to a blockchain maintained by a distributed consensus network. Typically, the currency is attributed financial value based on market interest in that currency. The token is managed, at least initially, by a central authority (the smart contract provider) whereas the currency is distributed and not managed by any specific entity.

The cryptographic tokens (Avits) are data constructs that are subject to rules of the smart contract. The smart contract's rules are configured upon execution of the smart contract and cause the cryptographic tokens to exist in either a circulation group or a non-circulation group. Avit tokens existing in the circulation group are associated with cryptographic wallets of at least one account holder at a bank or depository institution. Conversely, Avit tokens in the non-circulation group are associated with the administrator and not any of the users/account holders. The group with which each Avit is associated is a function of a protocol of the smart contract that imposes transfer restrictions on the Avits. Avits of the non-circulation group cannot be associated with a user's cryptographic wallet due to protocol limitations of the first smart contract. However, the Avits still exist in a cryptographic wallet, but it is one that is not associated with any individual user but rather with the bank or depository institution itself.

In step 304, an account holder submits a request to obtain Avits. In some embodiments, the account holder had already completed appropriate BSA/KYC/AML checks in order to be issued a fiat deposit account at a bank. The account holder will have available funds in their existing deposit account at the bank or depository institution. In step 306, the exchange for Avits using fiat currency is initiated via an online portal. In some embodiments, the exchange is initiated using a multifactor authentication device. In step 308, the account holder inputs an amount of Avits desired (less than or equal to the amount of fiat currency available via their deposit account balance).

In step 310, the account holder indicates whether the Avits should be delivered into a custodial wallet account associated with the smart contract or, alternatively, an external blockchain-based destination outside the smart contract platform. In step 312, the bank or depository institution initiates a demand deposit (debit) from the customer's fiat deposit account for the Avit purchase and a Trust General Ledger is the offsetting credit. Avits are exchanged for fiat currency at a one-to-one correspondence. The issuer of Avits removes the fiat currency from the account holder's debit account. The Avits are drawn from the non-circulation group and shifted into the circulation group. When shifted into the circulation group, the Avits are transferred to the indicated custodial wallet/blockchain destination. The bank or depository institution's balance at its master account with the federal reserve bank does not change.

In some embodiments, step 312 further includes a new Avit minting transaction (on a blockchain) sending the new Avit into the Avit Pooled Fungible account (a custodial trust account) on behalf of the customer. In some embodiments, the minting transaction deposits all of the new Avits into the non-circulation group. In some embodiments, the minting transaction is a multi-signature transaction as dictated by the smart contract. Signatures may be held by multiple entities within the bank or depository institution. In some embodiments, the minting transaction skips the non-circulation group and goes directly to the account holder's wallet (e.g., personal wallet, external wallet, or custody wallet).

In step 314, the account holder's Avit custody account is credited to reflect ownership of Avits in one-on-one correspondence with the exchanged fiat currency. The account holder owns a pro rata share of the pool of Avits held in custody by Avanti's trust department in the form of a fungible bailment.

In some embodiments, each Avit is unique. Uniqueness enables the administrator of the smart contract, a bank or depository institution, to track movement of all of the cryptographic tokens across any chosen blockchain platform. Examples of unique cryptographic tokens are those generated according to the ERC-721 standard. Alternatively, those generated via ERC-20 standard may still be unique. Uniqueness of a cryptographic token does not necessarily alter fungibility thereof. Uniqueness may be based on serial numbers that enable clear tracking without a meaningful difference in functionality.

Figure 4:
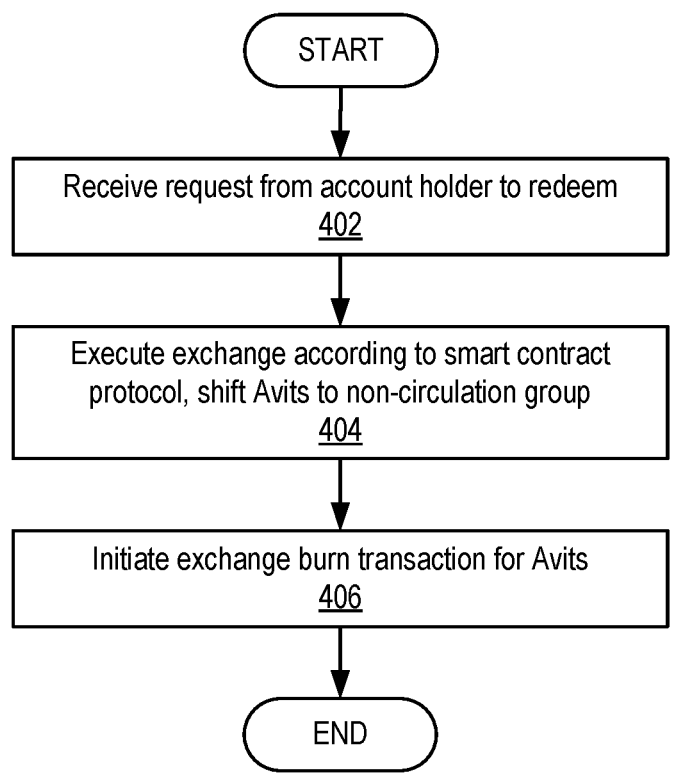
FIG. 4 illustrates a process to redeem Avits.

FIG. 4 illustrates a process to redeem Avits. In step 402, the account holder submits a request to redeem Avits. Similarly to the process for obtaining Avits, the account holder will have already completed appropriate KYC/AML checks in order to be issued a fiat deposit account. The account holder additionally must have available balance in its existing Avits Account (be that account be managed via a custodial wallet or some other external wallet). In some embodiments, the request is performed via a mobile application of a web browser application.

In step 404, the account holder's account is debited to reflect redemption of Avits and exchanged for fiat currency to that account holder's deposit account. Exchanging the relevant Avits shifts, by operation of the smart contract, those Avits from the circulation group to the non-circulation group. The exchange is performed via a blockchain recorded transaction. The transaction is issued or broadcast by the smart contract administrator. The smart contract responds to the published blockchain transaction to transfer the Avits. The Avits exist on the blockchain (e.g., in circulation) until an exchange back to fiat occurs.

The bank or depository institution executes an internal transfer (debit) of fiat from the Avits General Ledger (a trust account holding cash backing Avits) to the account holder's deposit account (e.g., a bank account) and the bank or depository institution's balance at its master account with the federal reserve bank does not change.

In step 406, in response to the exchange and the reacquisition of the Avits into the non-circulation group, the bank or depository institution initiates a new Avit burning transaction (on a blockchain) removing the non-circulation Avits from existence. Avanti would "burn" (i.e., destroy) unassigned excess Avits on some regular schedule, such as once per month. Authorized but unassigned Avits would remain in the Avits Pooled Fungible Account in the name of an Avanti house account. In some embodiments, the burning transaction is performed on the Avits while still in the circulation group.

Figure 5:
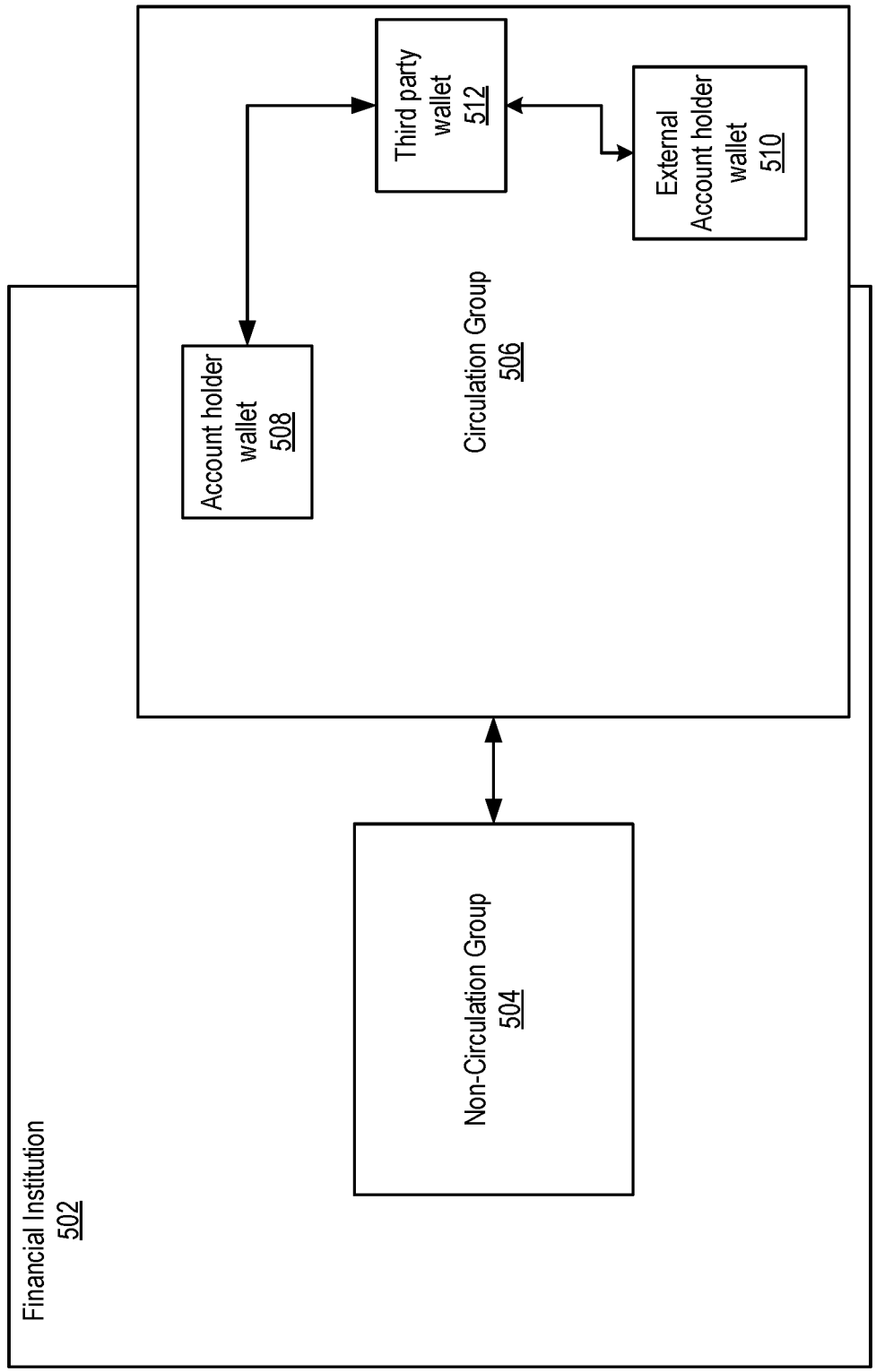
FIG. 5 is a block diagram illustrating cryptographic token transaction locations.

FIG. 5 is a block diagram illustrating cryptographic token transaction locations. The bank or depository institution 502 has control over a number of the transaction locations including the non-circulation group 504 and the circulation group 506. Tokens present in the non-circulation group 504 are not associated with any particular account holder. Tokens present in the circulation group 506 are associated with account holders. The account holders choose whether their tokens are held in an account holder wallet 508 that is controlled by the bank or depository institution 502, held in custody within the circulation group 506, or held in an external account holder wallet 510 outside of the bank or depository institution 502 control.

The account holders may trade their tokens with third party users 512 who are similarly outside the bank or depository institution 502.

Figure 6:
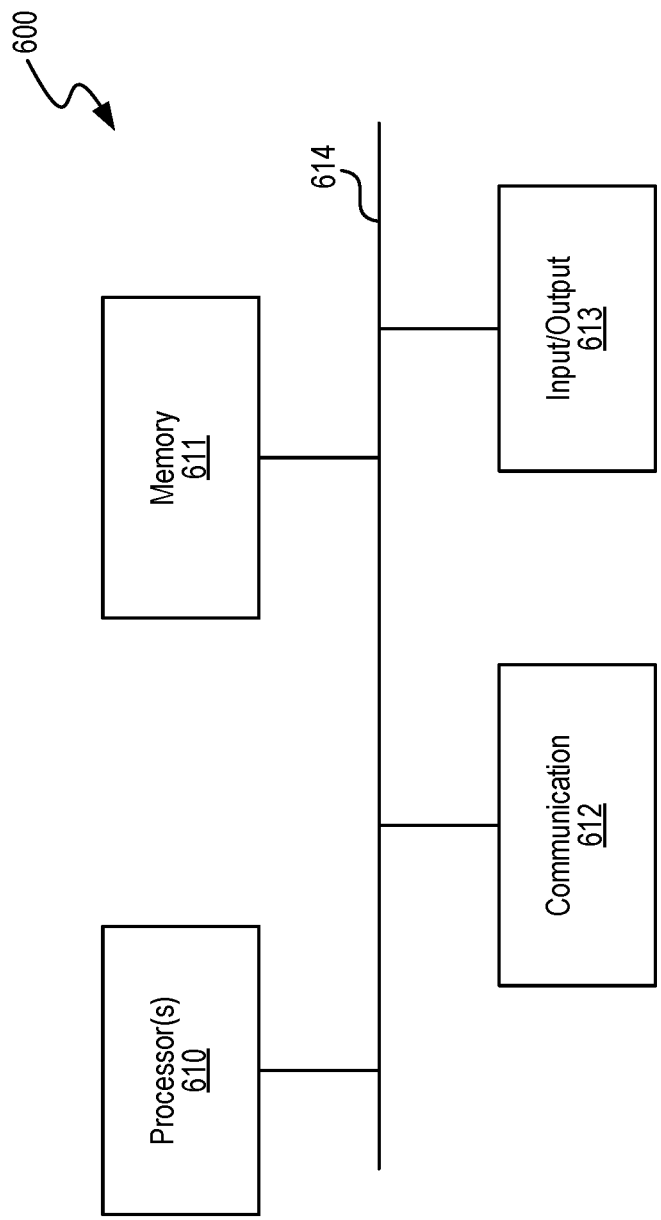
FIG. 6 is a block diagram of an exemplary computing system.

FIG. 6 is a high-level block diagram showing an example of a processing device 600 that can represent a system to run any of the methods/algorithms described above. A system may include two or more processing devices such as represented in FIG. 6, which may be coupled to each other via a network or multiple networks. A network can be referred to as a communication network.

In the illustrated embodiment, the processing device 600 includes one or more processors 610, memory 611, a communication device 612, and one or more input/output (I/O) devices 613, all coupled to each other through an interconnect 614. The interconnect 614 may be or include one or more conductive traces, buses, point-to-point connections, controllers, scanners, adapters, and/or other conventional connection devices. Each processor 610 may be or include, for example, one or more general-purpose programmable microprocessors or microprocessor cores, microcontrollers, application-specific integrated circuits (ASICs), programmable gate arrays, or the like, or a combination of such devices. The processor(s) 610 control the overall operation of the processing device 600. Memory 611 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 611 may store data and instructions that configure the processor(s) 610 to execute operations in accordance with the techniques described above. The communication device 612 may be or include, for example, an Ethernet adapter, cable modem, Wi-Fi adapter, cellular transceiver, Bluetooth transceiver, or the like, or a combination thereof. Depending on the specific nature and purpose of the processing device 600, the I/O devices 613 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Physical and functional components (e.g., devices, engines, modules, and data repositories, etc.) associated with processing device 600 can be implemented as circuitry, firmware, software, other executable instructions, or any combination thereof. For example, the functional components can be implemented in the form of special-purpose circuitry, in the form of one or more appropriately programmed processors, a single board chip, a field-programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip (e.g., software, software libraries, application program interfaces, etc.). The tangible storage memory can be computer-readable data storage. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

The invention claimed is:

1. A method of linking a cryptographic token issued by a financial institution with fiat currency deposits held within the same financial institution, comprising:
   providing, by an administrator affiliated with the financial institution, a first smart contract that generates a set of cryptographic tokens as data constructs that are subject to rules of the first smart contract, said rules configured upon execution of the first smart contract to cause the set of cryptographic tokens to exist in either a circulation group or a non-circulation group, cryptographic tokens existing in the circulation group being associated with a first cryptographic wallet of at least one account holder at the financial institution;
   minting the set of cryptographic tokens of the first smart contract, and allocating all the newly minted cryptographic tokens into the non-circulation group via protocol limitations of the first smart contract;
   receiving a fiat currency deposit of a first amount from said at least one account holder, such that both the fiat currency deposit and cryptographic tokens are issued by the same bank or depository institution;
   issuing to the at least one account holder, in response to receipt of the fiat currency deposit within the same financial institution, a first quantity of cryptographic tokens that is in one-to-one correspondence with the first amount, said issuing conducted via a first immutable blockchain transaction based on a protocol delineated in the first smart contract that causes the set of cryptographic tokens to shift association from the non-circulation group to the circulation group;
   receiving the set of cryptographic tokens via a second immutable blockchain transaction, said receiving based on the protocol delineated in the first smart contract and causing dissociation from the first cryptographic wallet and a shift in association of the set of cryptographic tokens from the circulation group to the non-circulation group;

in response to receipt of the set of cryptographic tokens, transferring, to the at least one account holder, fiat currency corresponding to the set of cryptographic tokens on a one-to-one basis; and in response to completion of the shift in association of the set of cryptographic tokens from the circulation group to the non-circulation group, initiating a burn function of the first smart contract on the set of cryptographic tokens thereby causing the set of cryptographic tokens to cease to exist.

2. The method of claim 1, wherein the deposit of fiat currency is performed as an exchange and hence the fiat currency is not associated with the at least one account holder by the financial institution.

3. The method of claim 1, wherein the first immutable blockchain transaction is implemented via a cryptocurrency underlying the first smart contract, the cryptocurrency independent of the cryptographic tokens.

4. The method of claim 1, wherein the first immutable blockchain transaction is implemented via a cryptocurrency, the cryptocurrency independent of the cryptographic tokens.

5. The method of claim 1, wherein each of the cryptographic tokens is unique.

6. The method of claim 5, wherein each of the unique cryptographic tokens is a non-fungible token.

7. The method of claim 1, wherein cryptographic tokens of the non-circulation group cannot be associated with a user cryptographic wallet due to protocol limitations of the first smart contract.

8. The method of claim 1, further comprising:
transferring, by the user, the set of cryptographic tokens from the first cryptographic wallet to a second cryptographic wallet data construct associated with another user via a third immutable blockchain transaction based on a protocol delineated in the first smart contract.

9. The method of claim 1, wherein the first cryptographic wallet is a custodial wallet controlled by the financial institution.

10. The method of claim 1, further comprising:
broadcasting, by the administrator, events via immutable blockchain transactions that cause the first smart contract to initiate burn or mint actions.

11. A computing system, comprising:
a processor; and
a non-transitory computer-readable medium having stored thereon instructions that, when executed by the processor, cause the processor to perform operations including:
providing a first smart contract affiliated with a financial institution that generates a set of cryptographic tokens as data constructs that are subject to rules of the first smart contract, said rules configured upon execution of the first smart contract to cause the set of cryptographic tokens to exist in either a circulation group or a non-circulation group, cryptographic tokens existing in the circulation group being associated with a first cryptographic wallet of at least one account holder at the financial institution;
minting the set of cryptographic tokens of the first smart contract, and allocating all the newly minted cryptographic tokens into the non-circulation group via protocol limitations of the first smart contract;
receiving a fiat currency deposit of a first amount from said at least one account holder, such that both the fiat currency deposit and cryptographic tokens are affiliated with a same bank or depository institution;
issuing to the at least one account holder, in response to receipt of the fiat currency deposit, a first quantity of cryptographic tokens that is in one-to-one correspondence with the first amount, said issuing conducted via a first immutable blockchain transaction based on a protocol delineated in the first smart contract that causes the set of cryptographic tokens to shift association from the non-circulation group to the circulation group;
receiving, a user, the set of cryptographic tokens via a second immutable blockchain transaction, said receiving based on the protocol delineated in the first smart contract and causing dissociation from the first cryptographic wallet and a shift in association of the set of cryptographic tokens from the circulation group to the non-circulation group;
in response to receipt of the set of cryptographic tokens, transferring, to the at least one account holder, fiat currency corresponding to the set of cryptographic tokens on a one-to-one basis; and
in response to completion of the shift in association of the set of cryptographic tokens from the circulation group to the non-circulation group, initiating a burn function of the first smart contract on the set of cryptographic tokens thereby causing the set of cryptographic tokens to cease to exist.

12. The computing system of claim 11, wherein the first immutable blockchain transaction is implemented via a cryptocurrency underlying the first smart contract, the cryptocurrency independent of the cryptographic tokens.

13. The computing system of claim 11, wherein the first immutable blockchain transaction is implemented via a cryptocurrency, the cryptocurrency independent of the cryptographic tokens.

14. The computing system of claim 11, wherein cryptographic tokens of the non-circulation group cannot be associated with a cryptographic wallet due to protocol limitations of the first smart contract.

15. The computing system of claim 11, wherein the first cryptographic wallet is a custodial wallet controlled by the financial institution.

16. A non-transitory computer-readable medium having stored thereon instructions that, when executed by one or more processors, cause the one or more processors to perform operations including:
providing a first smart contract affiliated with a financial institution that generates a set of cryptographic tokens as data constructs that are subject to rules of the first smart contract, said rules configured upon execution of the first smart contract to cause the set of cryptographic tokens to exist in either a circulation group or a non-circulation group, cryptographic tokens existing in the circulation group being associated with a first cryptographic wallet of at least one account holder at the financial institution;
minting the set of cryptographic tokens of the first smart contract, and allocating all the newly minted cryptographic tokens into the non-circulation group via protocol limitations of the first smart contract;
receiving a fiat currency deposit of a first amount from said at least one account holder, such that both the fiat currency deposit and cryptographic tokens are affiliated with a same bank or depository institution;
issuing to the at least one account holder, in response to receipt of the fiat currency deposit, a first quantity of cryptographic tokens that is in one-to-one correspondence with the first amount, said issuing conducted via a first immutable blockchain transaction based on a protocol delineated in the first smart contract that causes the set of cryptographic tokens to shift association from the non-circulation group to the circulation group;

receiving, from a user, the set of cryptographic tokens via a second immutable blockchain transaction, said receiving based on the protocol delineated in the first smart contract and causing dissociation from the first cryptographic wallet and a shift in association of the set of cryptographic tokens from the circulation group to the non-circulation group;

in response to receipt of the set of cryptographic tokens, transferring, to the at least one account holder, fiat currency corresponding to the set of cryptographic tokens on a one-to-one basis; and in response to completion of the shift in association of the set of cryptographic tokens from the circulation group to the non-circulation group, initiating a burn function of the first smart contract on the set of cryptographic tokens thereby causing the set of cryptographic tokens to cease to exist.

17. The non-transitory computer-readable medium of claim 16, wherein the deposit of fiat currency is performed as an exchange and hence the fiat currency is not associated with the at least one account holder by the financial institution.

18. The non-transitory computer-readable medium of claim 16, wherein the first immutable blockchain transaction is implemented via a cryptocurrency underlying the first smart contract, the cryptocurrency independent of the cryptographic tokens.

19. The non-transitory computer-readable medium of claim 16, wherein the first immutable blockchain transaction is implemented via a cryptocurrency, the cryptocurrency independent of the cryptographic tokens.

20. The non-transitory computer-readable medium of claim 16, wherein cryptographic tokens of the non-circulation group cannot be associated with a cryptographic wallet due to protocol limitations of the first smart contract.

21. The non-transitory computer-readable medium of claim 16, the operations further comprising:

transferring, by the user, the set of cryptographic tokens from the first cryptographic wallet to a second cryptographic wallet data construct associated with another user via a third immutable blockchain transaction based on a protocol delineated in the first smart contract.

* * * * *